(12) United States Patent
Gordon et al.

(10) Patent No.: US 8,271,677 B2
(45) Date of Patent: *Sep. 18, 2012

(54) ORIGIN REQUEST WITH PEER FULFILLMENT

(75) Inventors: Michael M. Gordon, Paradise Valley, AZ (US); Nathan F. Raciborski, Phoenix, AZ (US); Michael D. Maddux, Cave Creek, AZ (US); Jon B. Corley, Peoria, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/424,247

(22) Filed: Mar. 19, 2012

(65) Prior Publication Data

US 2012/0191808 A1 Jul. 26, 2012

Related U.S. Application Data

(60) Division of application No. 13/214,124, filed on Aug. 19, 2011, which is a continuation of application No. 12/265,647, filed on Nov. 5, 2008, now Pat. No. 8,090,860.

(60) Provisional application No. 60/985,590, filed on Nov. 5, 2007.

(51) Int. Cl.
*G06F 15/16* (2006.01)

(52) U.S. Cl. ........... 709/231; 709/203; 709/217; 725/86

(58) Field of Classification Search ................ None
See application file for complete search history.

(56) References Cited

U.S. PATENT DOCUMENTS 7,995,756 B1 * 8/2011 McKinney et al. ........... 380/247
2003/0028623 A1 * 2/2003 Hennessey et al. ........... 709/219

* cited by examiner

*Primary Examiner* — Mohamed Ibrahim
(74) *Attorney, Agent, or Firm* — Kilpatrick Townsend & Stockton LLP (57) ABSTRACT

A method, apparatus and system for data transfer is disclosed. For example, settings from multiple entities arranged in a multi-tier control plane are used to set data transfer policies. The policies are used to govern data transfers such as between end users or from an origin server.

17 Claims, 9 Drawing Sheets

ORIGIN REQUEST WITH PEER FULFILLMENT

CROSS-REFERENCES TO RELATED APPLICATIONS

The present application is a divisional of U.S. application Ser. No. 13/214,124, filed on Aug. 19, 2011, which is a continuation of U.S. application Ser. No. 12/265,647, filed on Nov. 5, 2008, which is a non-provisional application claiming the benefit and priority under 35 U.S.C. 119(e) of U.S. Application No. 60/985,590, filed on Nov. 5, 2007. All the above-listed applications are hereby incorporated by reference in their entireties for all purposes.

BACKGROUND

1. Field of the invention

This disclosure relates in general to network delivery of data and, but not by way of limitation, to transfer of content in unique ways.

2. Background

Traditional data delivery using the Internet falls into two broad categories, namely, traditional origin download and end user originated download. Either type of download can be used for content delivery such as file uploads and downloads or streaming delivery. In a traditional origin download, a centralized server (such as an origin server), a traditional content delivery network or a traditional cache operates as a source of the content for the end users. In a user originated download one end user sources content to another end user.

In early user originated download systems, often referred to as first-generation peer-to-peer (P2P) content delivery systems, when an individual end user seeks to find content available from its peers, the end user logs into a central indexing server. The requesting end user consults a tracker function within a central indexing server that serves as a file directory of content available from sourcing end users. Once a sourcing end user offering the requested content is identified, the actual content transfer occurs directly between the requesting and sourcing end users.

User originated download is controversial for many reasons. There is a perception that user originated download fosters copyright theft. In addition, internet service providers (ISPs) dislike user originated downloading because of the high level of resource utilization it imposes on the ISP system and the difficulties associated with managing an increased flow of data. Not withstanding these issues, user originated downloads continue to become more popular among end users to support applications such as Internet telephony, file/stream transfer and Internet television.

Many ISPs have attempted to regain control over the resource utilization of their network infrastructure by attempting to identify and regulate user originated downloads. Some have resorted to traffic throttling or shaping to slow down or eliminate resource utilization.

However, second-generation user originated download systems, also known as decentralized P2P systems, have eliminated the need for a central server. In such a system, peers send search queries to other peers. If a peer cannot service a request, it forwards the query to other peers until the requested information is found. When the information is found, the initiating peer receives the download directly from the peer with the information. Using these and other techniques, the second-generation user originated download systems seek to evade the network restrictions by impeding the ability of the ISP to detect P2P traffic as there is no central indexing server.

Third-generation hybrid user originated systems, also known as hybrid P2P systems, operate between a centralized directory structure and a distributed structure. The networks use super nodes which act as mini central servers to keep the network distributed while reducing the time required to identify the holder of requested content. These super nodes are typically unaware that they have been selected to act as such. Often, the third-generation user originated download systems also seek to evade the network restrictions by impeding the ability of the ISP to detect the P2P traffic.

There is a long tail theory that suggests obscure content is difficult to deliver to end users efficiently. Caches are efficient at delivery of commonly requested items, but rarely store obscure content. Often obscure content must be sourced from the origin server if still available. Where an end user has the obscure content, depending on the delivery suitability of that user, user originated download can serve to source the content to another end user, without going back to the origin server. This type of efficient transfer benefits both the end user and the ISP.

SUMMARY

Embodiments of the data transfer system and method for controlling the behavior of end user clients using a single point of interface to Internet Service Providers (ISPs) may be implemented in conjunction with a global resource authority infrastructure. This infrastructure may be used to build a wide range of distributed services and applications in which each device is controllable through a multi-tier control plane using their IP address space.

In one embodiment, the present disclosure provides a method for transferring content between clients. A first setting from a first entity indicating a first set of potentially eligible sources is received. A second setting from a second entity indicating a second set of potentially eligible sources is received. A request for content from a client is received. A policy based on the first and second settings is determined. The policy indicates a set of eligible sources. The set is drawn from the first set and the second set. A subset of the set of eligible sources that have the content is determined. Typically, the subset includes one or more client stations. An indication of the subset is sent to the client. In some cases, the determination of the policy indicating the set of eligible sources includes determining that the set of eligible sources includes an origin server. In other cases, the receipt of the request for content includes receiving the request for content from the client specifying content sourced from an origin server. In yet other cases, the receipt of the first setting comprises receiving a setting indicating a minimum acceptable data delivery rate required of the first set of potentially eligible sources. Sometimes, receipt of the second setting includes receiving the second setting from an element of an internet service provider (ISP) servicing the client.

In another embodiment, the present disclosure provides a data transfer system configured to allow content download between end user devices. The data transfer system may include a first client associated with a first device capable of communication over the Internet and configured to provide a first setting from which a first set of potentially eligible sources can be determined. It may also include a second client associated with a second device capable of communication over the Internet. The system may have a network entity configured to provide a second setting from which a second set of potentially eligible sources can be determined. The system may receive the first and second settings as well as a request for content from the first client. It may determine a policy based on the first and second settings. The policy allows determination of a set of eligible source devices. The system may also determine a subset of the set of eligible sources that have the content. Sometimes, the subset includes the second client. The system sends an indication of the second client to the first client. The first setting sometimes indicates a minimum acceptable data delivery rate required of the first set of potentially eligible sources. The network entity may be an element of an internet service provider (ISP) servicing the first client. The network entity may characterize a relationship between the first client and the second client and specify content sharing privileges associated with the relationship. The system may be configured to determine that the subset of eligible sources includes an origin server. The system may be configured to receive the request for content specifying content sourced from an origin server and to determine a subset that includes only end users.

In yet another embodiment, the present disclosure provides a method of transferring content between clients. A client layer in an internet device receives one or more application settings from one or more applications. The one or more application settings indicate characteristics of a first set of potentially eligible clients. The client layer determines one or more client settings which are a function of the one or more application settings. The client layer receives a request for content from a requesting application. Information regarding a set of eligible clients is retrieved. The set of eligible clients is determined based on the one or more client settings and one or more network settings. An Internet component determines the one or more network settings. The internet component is remote from a device associated with the applications. The set of eligible clients either matches or is a subset of the first set. Information regarding a sourcing client is retrieved, such as by the client layer, another client, a super node or dispatcher-type entity. The sourcing client is within the set of eligible clients and has the content. The client layer requests the content from the sourcing client for delivery to the requesting application. In some cases, the request for content specifies content sourced from an origin server. In some cases, an eligible origin server is found which can service the request. One of the application settings may indicate a minimum acceptable data delivery rate required from the first set of potentially eligible sources. A client associated with one or more client settings may have a defined relationship to a second client from within the set of eligible. Content sharing privileges associated with the relationship may be specified.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Throughout this document, the terms content delivery and content download are used and can mean either file download or streaming delivery. Additionally, a content object can be either a file or a stream. For example, the content object could be a voice call stream, a video stream, an image file, a music file, a live concert, an animation, an advertisement, a web page, a slide show, data file, executable software or the like.

Figure 1:
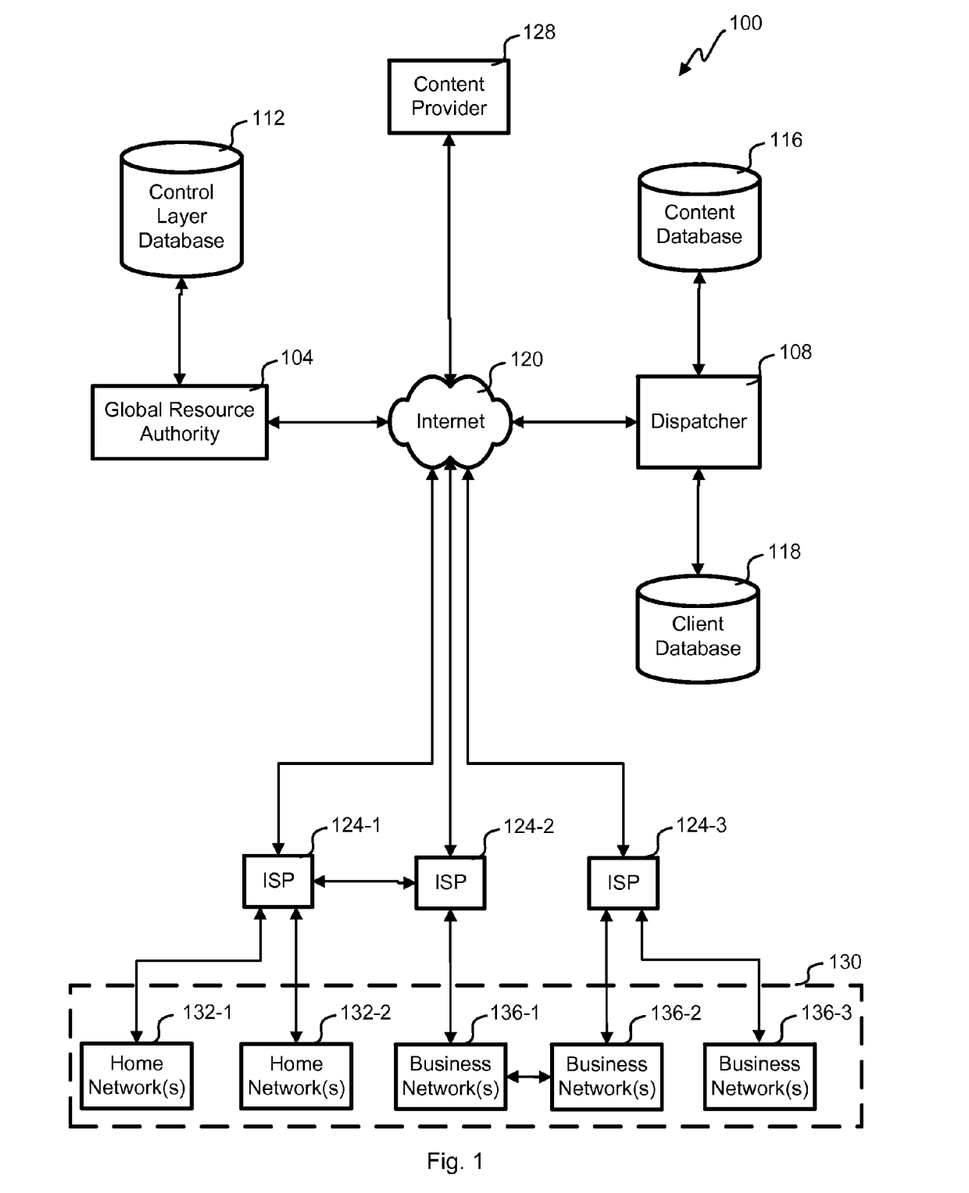
FIG. 1 depicts a block diagram of an embodiment of a data transfer system.

Referring first to FIG. 1, a block diagram of an embodiment of a data transfer system 100 is shown. The data transfer system 100 allows end users in home networks 132 or business networks 136 to request and source content downloads from/to other end users directly. The end user, some times simply called a user, is typically a personal computer but may be any user controlled device capable of communicating over the Internet, such as, by way of example, a handheld device, media player, mobile phone, or supercomputing terminal. In some cases, an end user may include a networked set of end users.

In addition to data transfer from end user to end user, the data transfer system 100 shown in FIG. 1 also allows for traditional origin download between the end user 132 and a content provider 128. A content object may be referenced in a variety of protocols. For example, a universal resource locator (URL) could reference a content object available from the content provider. In many cases, a content provider 128 contracts with a content delivery network (CDN) to outsource delivery of content objects. A CDN is a system of computers networked together across the Internet that cooperate transparently to deliver content, often for the purpose of improving performance, scalability, cost efficiency and the like. For example, a large, on-line photo processing enterprise with a global footprint may contract with a CDN to distribute the functionality of the user interface to various worldwide locations to speed the response to a query by the end user. In such cases, both the content provider and the CDN are motivated to use the CDN network efficiently to further increase performance. In one aspect, the configuration shown in FIG. 1 may be used to this end.

Although many network configurations are possible, for illustrative purposes, in FIG. 1 we assume that content provider 128 has contracted with a CDN. According to the exemplary embodiment shown in FIG. 1, the CDN controls a global resource authority 104 and a control layer database 112 as well as a dispatcher 108, content database 116 and a client database 118, each of which is discussed further below. In other embodiments, these blocks could reside with and be controlled by an ISP or other entity.

Often, especially when the size of some of the content downloads is expected to be quite large, the content provider 128 transfers to the receiving end user a download manager or client. A download manager is a software program which performs the task of downloading (and sometimes uploading) content from (and sometimes to) the Internet for storage. The typical download manager at a minimum provides means to recover from errors without losing the work already completed. Sometimes a download manager provides other functions such as splitting the content file to be transferred into two or more segments, which are then transferred in parallel, potentially making the process faster. According to one aspect, the download manager may also include control layer software as described below.

According to one aspect, a control plane of the global resource authority 104 regulates which download managers or clients in the home and business networks 132, 136 can request and source a particular content object and under what conditions those clients may do so. The global resource authority 104 includes policies to enable control of the behavior and activities of the clients in the home and business networks 132, 136. According to these policies, the clients can receive and request content globally or within some limited scope, or can be prohibited from either sourcing or receiving altogether. In one aspect, the global resource authority 104 is under the control of a CDN. In another aspect, the global resource authority 104 may be under the control of an Internet service provider (ISP) 124, a content provider 128 and/or other entity.

For example in one aspect, control layer client software is transferred to the end user to enable the control plane. For example, the client software may be transferred from the global resource authority 104, the content provider 128, the ISP 124 or another end user. If transferred from a content provider 128, the transfer may occur in association with the installation of a download manager. If transferred from an ISP 124 or global resource authority 104, the transfer may occur when a new end user is coupled to a home or business network 132, 136 for the first time or as part of software distributed at the time an end user initiates service from the ISP 124. The client can be used in conjunction with other elements to provide efficient download of content according to the control plane policies.

In one aspect, the client transfers status information and control layer settings to the global resource authority 104 which may also receive status information and control layer settings from other entities such as ISP 124, content provider 128 or both. The global resource authority 104 uses the status information and control layer settings to determine a set of policies which, for example, control content transfer over the network. The status information and control layer settings may be stored in the control layer database 112 along with the resulting policies.

The ISP 124 aggregates users 130 to provide access to private wide area networks (WANs) and the Internet. Generally, the users 130 of ISPs 124 fall into two categories: users who control a specific IP address space, such as business networks 136, end users who do not control a specific IP address space, such as home networks 132. Some ISPs 124 tend to specialize in one type of user or the other. Generally, bandwidth used by home users is oversubscribed such that all users of the ISP cannot use the full bandwidth at times of heavy usage. Bandwidth for businesses can often be guaranteed to have a certain amount of bandwidth.

Users 130 connect individual devices and/or networks to the ISPs 124 to receive Internet connectivity. Home and business networks 132, 136 often use a router to connect with the ISP using some sort of last mile technology for connectivity (e.g., DSL, cable modem, WiFi, WiMax, satellite modem, local communications circuit, etc.). Home networks 132 may have a number of computing devices all sharing the Internet connection (e.g., personal digital assistants (PDAs), laptops, VOIP, UMA phones, IP TV set tops, desktops, Internet appliances, alarm systems, etc.). Business networks 136 may have a number of computing devices all sharing the Internet connection (e.g., user PCs, web servers, email servers, etc.) and may also have leased lines between various locations or VPN tunnels to tie various business networks 136 together. In the depicted example, the first business network 136-1 has a connection with the second business network 136-2.

The ISPs 124 interact with other ISPs and backbone providers to allow their users full-route access to the Internet 120. This may involve purchase of connectivity from Tier 1 providers, peering arrangements with other ISPs 124, or both. In the depicted example, the first ISP 124-1 has a peering relationship with the second ISP 124-2 such that traffic can pass directly, and typically at a reduced cost and/or latency, between the two ISPs 124 to avoid the additional network distance, inefficiency, time delay cost and the like associated with using a Tier 1 provider to pass traffic between the first and second ISPs 124. Although not shown, an ISP 124 can have subnetworks, such as for servicing a specific geographic region or for other reasons. Peering may occur in one region of an ISP and not another.

According to one aspect, the dispatcher 108 provides a centralized server which may store an indication of a client's availability and status, control layer settings and policies, current activity state, or a combination of these and like parameters. The dispatcher 108 may also include information with respect content from origin servers. An origin server is any server cache etc. which is used to service a request for content in a conventional, non-point-to-point fashion. The dispatcher 108 may operate according to control layer policies which may, for example, be stored in the client data base 118. In addition, the dispatcher 108 may be associated with the content database 116 which serves to store information regarding available sources of content (in some cases both end users and origin servers) as well as, in some embodiments, frequently requested user originated or origin server content.

In one embodiment, the dispatcher 108 may satisfy a traditional origin download request with an end user originated download. For example, the dispatcher 108 determines whether the requested content should be sourced from another user 130 or retrieved form the content provider 128 or other origin server. In some systems, the dispatcher 108 may always favor download from another user 130 rather than the content provider 128. Other embodiments the dispatcher 108 only initiates user originated download when such a transfer is likely to have an advantage, such as a quality of service (QoS) advantage, an increased data rate, a more efficient use of system resources, a better cost structure and the like.

In one embodiment, the dispatcher 108 may include a subset of the policies from the global resource authority 104 to control the content delivery. Another embodiment, the dispatcher 108 may include the policies from the global resource authority 104. The policies may be set according to one or more control layer settings and serve to manage content delivery to, from and between clients.

According to one aspect, the dispatcher 108 can uniquely identify a client and associate the client with the relevant control layer policies. A client can be programmed to check in periodically or when its address changes such that the dispatcher 108 can continue to properly identify the client. In another embodiment, the client identifies itself to the dispatcher 108 whenever a directory listing or content object is requested by the end user or from the end user.

In one embodiment, a client database 118 stores location information and applicable control layer settings or resulting policies for the clients, either individually or in groupings such as by network identifier. When responding to a request from a client, the location information, status information and policy information in the client database 118 is used by the dispatcher 108 to determine an appropriate source for the requested content.

In one embodiment, a client periodically reports the content available to be sourced to the dispatcher 108. The content database 116 stores the information to indicate the content objects available within the system. The system uses the client location information, status information, available content information and the control layer policies to determine how a requesting client should get content objects, including determining what other clients are potentially available to serve the object to the requesting client.

Although the embodiment shown in FIG. 1 uses a centralized directory in the dispatcher 108, other embodiments could allow one client to directly interact with other clients and/or super node clients to determine the content available for download. In these embodiments, the control layer policies could be implemented by the individual or super node clients. For example, the global resource authority 104 determines the policies from the various control layer settings, status information and the like and then distributes the policies to the other clients, super nodes or both. Alternatively, input from the multiple tiers in the control layer may report directly to the appropriate client or super node which could then determine the resulting policies. The policies could be presented to other clients.

According to an aspect in which the global resource authority 104 determines the control plane policies, the global resource authority 104 receives control layer information from various sources. The control layer database 112 stores this information. Additionally, the various control layer settings are parsed according to a hierarchy. Multiple tiers of the control plane are allowed to influence the control layer according to a predetermined hierarchy where typically the lower level tiers take precedence over higher level tiers. The final set of policies is determined for the clients, honoring settings associated with entities of higher priority over settings associated with entities have a lower priority. In one embodiment, one or more of the combined policies is set to the most restrictive setting received from any entity. The policy information is communicated to the dispatcher 108 for storage in the client database 118, as illustrated in FIG. 1.

Figure 2:
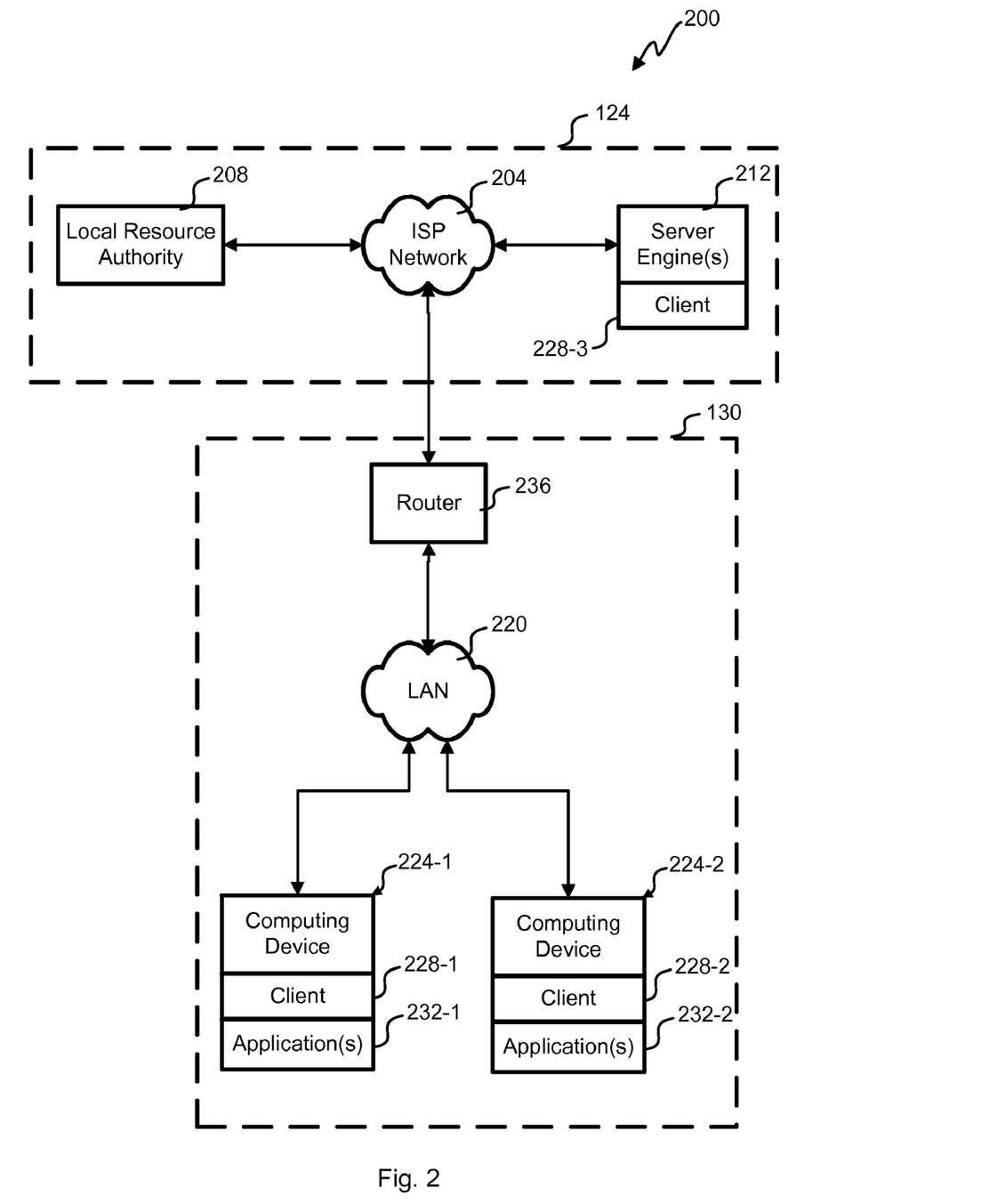
FIG. 2 depicts a block diagram of an embodiment of an ISP coupled to a user.

Referring next to FIG. 2, a block diagram 200 of an embodiment of the ISP 124 coupled to a user 130. It is to be understood that a typical configuration would include a number of users 130 coupled with a number of ISPs 124. The user 130 in this embodiment could be a home network 132 or business network 136. Although not shown, the user 130 may have multiple ISPs 124 or additional ways outside of its local area network (LAN) 220.

"An Internet component" is any component which is part of the data transfer system 100. As such, each of the entities shown in FIGS. 1 and 2 may be the referred to as an Internet component. The Internet component shown in FIGS. 1 and 2 can be implemented using standard hardware and software modules and techniques, which are further configured to operate according to the principles described herein. Except for the possible manual entry of one or more of the settings, in typical implementations the functions of the data transfer system 100 are largely executed using equipment and software. In many cases, the status and actions of the various hardware and software modules may be displayed for a human observer. For example, technical personnel may monitor the settings and policies associated with data transfer as well as the various database content. Similarly, a human operating an end user device is typically presented a visual representation associated with setup and operation according to the principles described herein.

"A network component" is a component which plays a role in transferring data to and from an end user device. The global resource authority 104, the control layer database 112, the dispatcher 108, the content database 116, the client database 118, the content provider 128, the local resource authority 208, the server engine 212 and the associated client 228, a corresponding content delivery network, the Internets 120 are examples of network components. The clients and user devices are not network components.

The user 130 has a number of computing devices 224. The computing device 224 includes a client 228 that allows both end user originated download and sourcing as well as traditional origin server download. Typically, the client 228 is implemented in software that runs on the computing device 224, although other implementations are also possible. The client can be part of the operating system layer, device driver layer, download manager or application layer. In one aspect, an application programming interface (API) to the client 228 allows any number of applications 232 to access and to influence the control layer settings and status of the client 228. The computing device 224, the client 228 and the application 232 are one embodiment of an end user. Typically, a router 236 bridges the LAN 220 of the computing devices 224 to the ISP network 204.

This embodiment of the ISP 124 includes one or more server engines 212, but other embodiments could include none. The ISP network 204 is coupled to one or more full route internet providers (not shown.) Server engines 212 increase the likelihood that content objects are found in the ISPs network without having to go back to the content provider 128. In one aspect, the dispatcher 108 and content database 116 are cognizant of the content stored in the server engine 212 and can route appropriate requests thereto. In another embodiment, the ISP network 204, such as, for example, by way of the local resource authority 208, intercepts requests for content which is stored in the server engine 212.

In the embodiment shown in FIG. 2, the ISP 124 includes such a local resource authority 208 to collect, select and process the control layer information. The local resource authority 208 operates within a limited network and performs locally a similar role as the global resource authority 104. For example, the local resource authority may receive status and setting information the clients 228. It may also operate to implement the control layer settings associated with the ISP 124.

Control layer settings can be provided to the local resource authority from a number of sources in various embodiments. For example, various applications 232, the client 228, the user 130, and the ISP 124 each can have control layer settings and status in one embodiment. In one aspect, the local resource authority 208 processes the various control layer settings and provides the resulting settings, policies, status and the like to the global resource authority 104.

The server engine 212 also has a client 228-3 for tracking status and settings. According to well-known techniques, a cache within the server engine 212 is populated based on user requests for content or other parameters. Once the cache of the server engine 212 has content, the server engine 212 can act as another end point that can source content to the end user clients, such as requested by the dispatcher 108 in response to either an origin or end user request. In addition to traditional cache functions, the server engine 212, in conjunction with local resource authority 208, may perform at a local level some of the same functions as the dispatcher 108, such as directing the satisfaction of a traditional origin download request with an end user originated download. In some embodiments, the server engine 212 may be a preferred source for content as compared to other possible sources in one embodiment. Some embodiments allow one server engine 212 to query other server engines 212 and/or end users to request content not currently found in the cache.

The ISPs 124 and business networks 136 can indicate, through their respective control layers, the extent to which the clients using their network can serve content objects to other clients in varying relationships with their network. The control layer settings may be based on the relationship between networks, such as peer relationships, intra-ISP relationships, metro sub-net relationships, business sub-net relationships, and/or unrestricted relationships. IP addresses, a range(s) of IP addresses or domains could be used to specify the relationship between any particular business network 136, ISP user base or the like.

Referring to the example of Table I, an exemplary set of relationships between end point networks is specified. These relationships may be reflected in the global resource authority 104, the control layer database 112 and content database 118 such that the scope of a client's sharing space can be determined. In one aspect, this information is also reflected in the local resource authority 208. The control layer settings, such as the type typically specified by the ISP 124, the networks 132, 136, indicate the allowed transfers between entities based on their relationship. Together, the peer relationship and the related settings determine the policies by which transfers are governed by the dispatcher 108.

For example, according to Table I, for user originated download, the ACME ISP peers with three other ISPs and, therefore, may have control layer settings which allow end user content download intra-network such that a client 132 in a network 136 of the ACME ISP can source content directly within the ISP network 204 and to any of the indicated peer networks. The Foo ISP has an open relationship with all other providers and, thus, allows its clients to receive user originated downloads from or source user originated downloads to any client on the ISP network 204 or Internet 120. The Atlas ISP has no end point relationships and prohibits the clients 228 from performing user originated download, and, thus, limits its clients to performing origin downloads. The Open ISP has an open end point relationship and allows its clients to exchange user originated content over any other ISP that allows its clients to exchange user originated content to and from the Open ISP network. Speeedy ISP has relationships with and allows peering with the ACME ISP, the TTC-Denver business and intra-network. The TTC-Denver business sub-net may allow user originated download to another business sub-net, affiliated business or other network groups. Specified on another line of Table I, the TTC-Denver business allows user originated download with the TTC-business entity.

Business networks 136 can specify the scope of user originated download acceptable for its clients in other ways. Large Corp only allows user originated exchanges within its network. The network could be defined to be one or many different locations by specifying the relevant IP addresses or other network information. The business networks could be specified in according to several schemes, such as by breaking out IP addresses or other network information into separate groups or including other IP addresses or other network information in a particular group. According to typical contractual relationships, ISPs for businesses generally avoid further restriction on how a business decides to participate in user originated download because the Internet service is sold to the business in an unrestricted manner so that the business to choose how best to utilize the allocated bandwidth.

TABLE I

End User Routing Table

| End Point Networks | Available End Points | Relationship |
|---|---|---|
| ACME ISP | Wyle ISP | Peer |
|  | Road Runner ISP | Peer |
|  | ACME ISP | Same Domain |
|  | Speeedy ISP | Peer |
| Large Corp | Large Corp | Same Domain |
| Foo ISP | All | Open |
| Atlas ISP | — | NA |
| TTC-Denver | TTC-DC | Metro Sub-net |
| Open ISP | All | Reciprocating Open |
| Speeedy ISP | ACME ISP | Peer |
|  | TTC-Denver Business | Business Sub-net |
|  | Speeedy ISP | Same Domain |

Some embodiments of the server engine 212 allow pre-populating the server engines 212 with content likely to be requested. Use of a server engine(s) can reduce the use of connectivity to the Internet or within its network by the ISP 124 to gather requested content. The dispatcher 108 or the server engine 212 itself could decide which content objects 108 are likely to be requested such that the cache can be pre-populated. Content providers 128 can also specify what is likely to be requested. In some embodiments, the content providers could purchase or lease space on the various server engines such that their content objects are delivered with higher QoS.

Use of the server engine(s) 212 can be controlled by the ISP 124 that has been allocated particular server engine 212 capacity. Use of the server engine 212 can be limited to the clients 228 within the ISP network 204. Additionally, other networks can be given access to the server engines 212 in some embodiments. In one embodiment, server engines 212 are controlled through the local and/or global resource authority 208, 104 by specifying settings such as those specified for clients 228, in a similar manner as discussed above with respect to Table I.

Figure 3A:
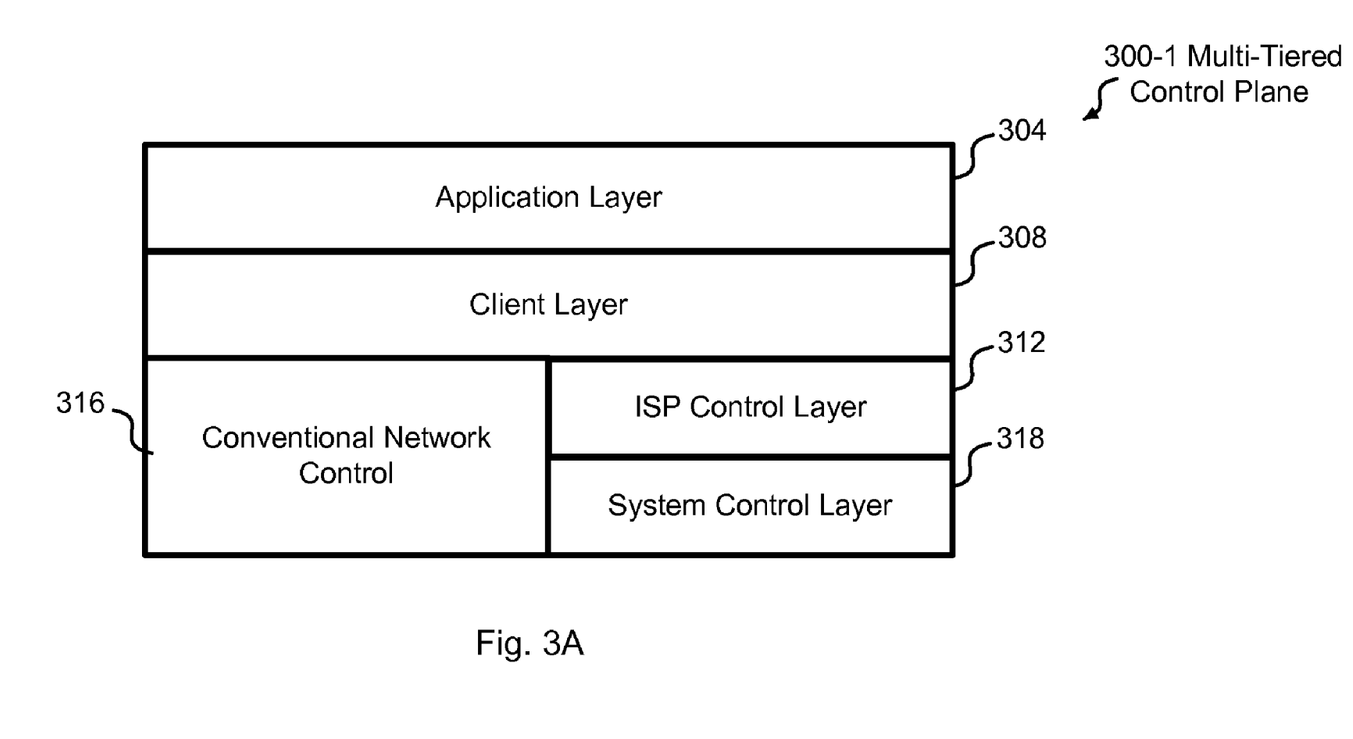
FIGS. 3A, 3B, and 3C depict diagrams of alternative embodiments of a multi-tiered control plane.

With reference to FIG. 3A, a diagram showing an embodiment of a multi-tiered control plane 300-1 is shown. At the top of the diagram, the application layer 304 is where the application(s) 232 reside that uses the client 228. The applications 232 have configuration options that indicate how the client 228 can be used. A particular layer on top of the diagram can have their control settings overridden by any layer below one hierarchy scheme. For example, the application layer 304 may specify that twenty simultaneous responses to requests for user originated downloads are allowed at one time, but the client control layer 308 specifies only four outbound user originated downloads may be executed at the same time. Because the application layer 304 is trumped by the client layer 308, only four outbound user originated downloads can be executed at any moment between the applications 232 using the client 228. Thus, the control layer settings sent by the client 228 to, for example, the global resource authority 104 specify a maximum of four simultaneous uploads or downloads.

Figure 3B:
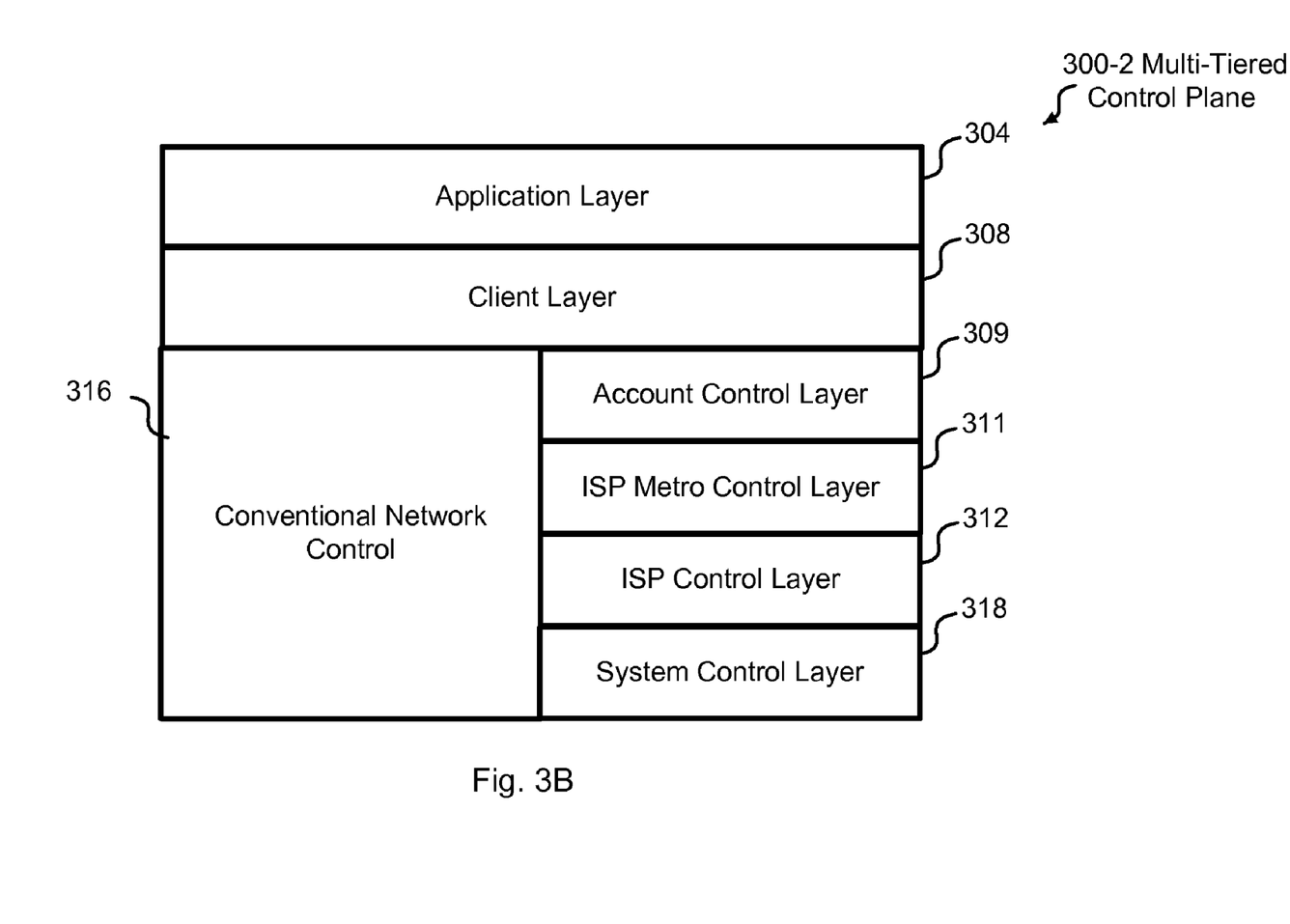

In one aspect, as shown in FIG. 3B, the settings for the application layer 304, the client control layer 308 as well as the account control layer 309 are sent to the global resource authority 104 and stored in the control layer database 112. The global resource authority 104 then determines the policies based at least in part on the settings. In another aspect, the client 228 processes the control layer settings of which it is aware and sends the combined result to the global resource authority 104. The global resource authority 104 then determines the policies based at least in part on the combined settings. In yet another aspect, the client 228 sends either the combined or raw control layer settings the local resource authority 208 which in turn combines them with other local settings of which it is aware and sends the resulting combined settings to the global resource authority 104. In any case, the resulting policies are transferred to the dispatcher 108 which stores them in the client database 118. The dispatcher 108 uses the policies to determine the actions which are taken in response to a request for content.

In the embodiment shown in FIG. 3A, there are four layers that control the user originated download. The client layer 308 can alternatively do a conventional origin download using a conventional network control structure 316 or preferably used the ISP control layer 312 and the system control layer 318. In one embodiment, both origin server and end user originated requests are sent to the dispatcher so that origin server request can be serviced in a point-to-point manner if appropriate and based on the policies implemented by the dispatcher 108. In order of hierarchy, the application layer 304, the client layer 308, an ISP control layer 312, and a system control layer 318 are shown. Each layer can specify settings that would form the control layer policies influencing how a user originated download is performed, in some embodiment. According to the embodiment shown in FIG. 3A, a lower layer takes precedence over a higher layer. Other embodiments may have more or fewer control layers, or only one control layer.

Different parties can optionally designate the control settings at the various layers. For example, the user may be able to modify options at the application and client layers 304, 308. The ISP management can set overriding settings at the ISP control layer 312. The system administrators can set yet further overriding settings at the system control layer 318. Interfaces in the application 232, client 228, local resource authority 208 and global resource authority 104 could be used by the various parties to enter the control layer settings.

Table II indicates examples of the things that could be part of the control plane for the application layer in one embodiment. The application 232 could specify individually the particular control setting desired. Different applications 232 could have different desired control settings. The application can specify if user originated download is even allowed in addition to conventional origin download and which type is preferred. The maximum outgoing/incoming bandwidth can be specified along with the number of simultaneous outgoing/incoming connections allowed. Further, a minimum and/or maximum delivery speed for the user originated downloads could be specified such that the download would switch to origin download or fail if that level of QoS were no longer available.

TABLE II

Application Control Layer

| Field | Example |
| --- | --- |
| Allow End User Delivery? | Yes |
| Allow Conventional Delivery? | Yes |
| Preferred Delivery Type | End User |
| Max Outgoing End User Delivery Bandwidth | 3000 kbps |
| Min Incoming End User Delivery Bandwidth | 6000 kbps |
| Max Outgoing Simultaneous End User Downloads | 20 |
| Max Incoming Simultaneous End User Downloads | 40 |
| Minimum Delivery Speed Before Switching to Origin Download | 50 kbps |

Table III specifies certain control settings for the control layer of the client layer 308. These control settings would apply to applications 232 in the higher application layer 304. In this example, the control settings for the client layer 308 are similar to those of the application layer 304. Additionally, the client layer 308 can specify whether central dispatch is used for content directories if the clients themselves hold the directory of available content objects. The number of applications that can simultaneously use the client is also specified in this embodiment.

TABLE III

Client Control Layer

| Field | Example |
| --- | --- |
| Allow End User Delivery? | Yes |
| Allow Conventional Delivery? | Yes |
| Preferred Delivery Type | End User |
| Max Outgoing End User Delivery Bandwidth | 600 kbps |
| Minimum Incoming End User Delivery Bandwidth | 1200 kbps |
| Max Outgoing Simultaneous End User Downloads | 4 |
| Max Incoming Simultaneous End User Downloads | 8 |
| Central/User Dispatch | Central |
| Maximum Number of Simultaneous Applications | 2 |

Table IV specifies the control settings an ISP layer 312 can specify for the users 130 in their defined address space. In addition to some of the control settings for the other layers, the ISP control layer 312 allows defining the scope of clients that can request user originated download of content objects like what was globally defined in Table I above. The ISP can specify the divisions allowed within their address space and how any server engines 212 can be used. One embodiment allows the ISP 124 to control and update the content delivery in over time such that the dispatcher 108 can reflect these updates. The ISP 124 may determine where an end user can download the requested content according to the system availability, control of unlicensed content and status of the other end users or server engines 212.

TABLE IV

ISP Control Layer

| Field | Example |
| --- | --- |
| Allow End User Delivery? | Yes |
| Allow Conventional Delivery? | Yes |
| Preferred Delivery Type | End User |

TABLE IV-continued

ISP Control Layer

| Field | Example |
|---|---|
| Max Outgoing End User Delivery Bandwidth | 300 kbps |
| Min Incoming End User Delivery Bandwidth | 600 kbps |
| Max Outgoing End User Downloads | 3 |
| Max Incoming End User Downloads | 6 |
| Defined Scope of User Originated Download | Intra-network, Peers |
| Serve within ISP Network | Yes |
| Further Serving Divisions within ISP Network | No |
| Serve outside ISP Transit Boundary | No |
| Serve ISP's Peer Networks | Yes |
| Internal Access to Server Engines | Yes |
| Peer Access to Server Engines | No |

At the system control layer 316, additional control settings can be specified. For example, directory listings can optionally be limited as specified by the control layers. As such, the system uses the control layer to avoid use of the system to transfer content that the copyright holders would disapprove of Additionally, content filtering could be optionally activated or enabled for only certain groups that use the system 100.

An example system control layer is depicted in Table V. For this example, the directory listing is limited by the control layers. Application, client, business, ISP and sub-net control layers are provided for in this example. Where there is protected content, meaning that the copyright holders would not allow sharing with other end users, the system could filter out those files from appearing in directory listings. This example allows sharing of downloading, processing, storage, VOIP, and streaming among clients 228.

TABLE V

System Control Layer

| Field | Example |
|---|---|
| Limit Directory Listing to Control Layers | Yes |
| Layers of control to allow | Application, Client, Business, ISP, Sub-net |
| Prevent Listing of Protected Content | Yes |
| Types of resource sharing to allow | Download, Processing, Storage, VOIP, Streaming |

Referring next to FIG. 3B, a diagram showing another embodiment of a multi-tiered control plane 300-2 is shown. This embodiment includes an account control layer 309 and an ISP metro control layer 311 between the client and ISP control layers 308, 312. The account control layer 309 allows the ISP account holder to specify control settings. For example, a parent in a home network 132 could specify control settings for the children in the home network. The ISP metro control layer 311 allows different geographic locations or groups of an ISP 124 to be individually controlled. For example, one group may have higher bandwidth such that a higher amount of user originated download can be tolerated.

Figure 3C:
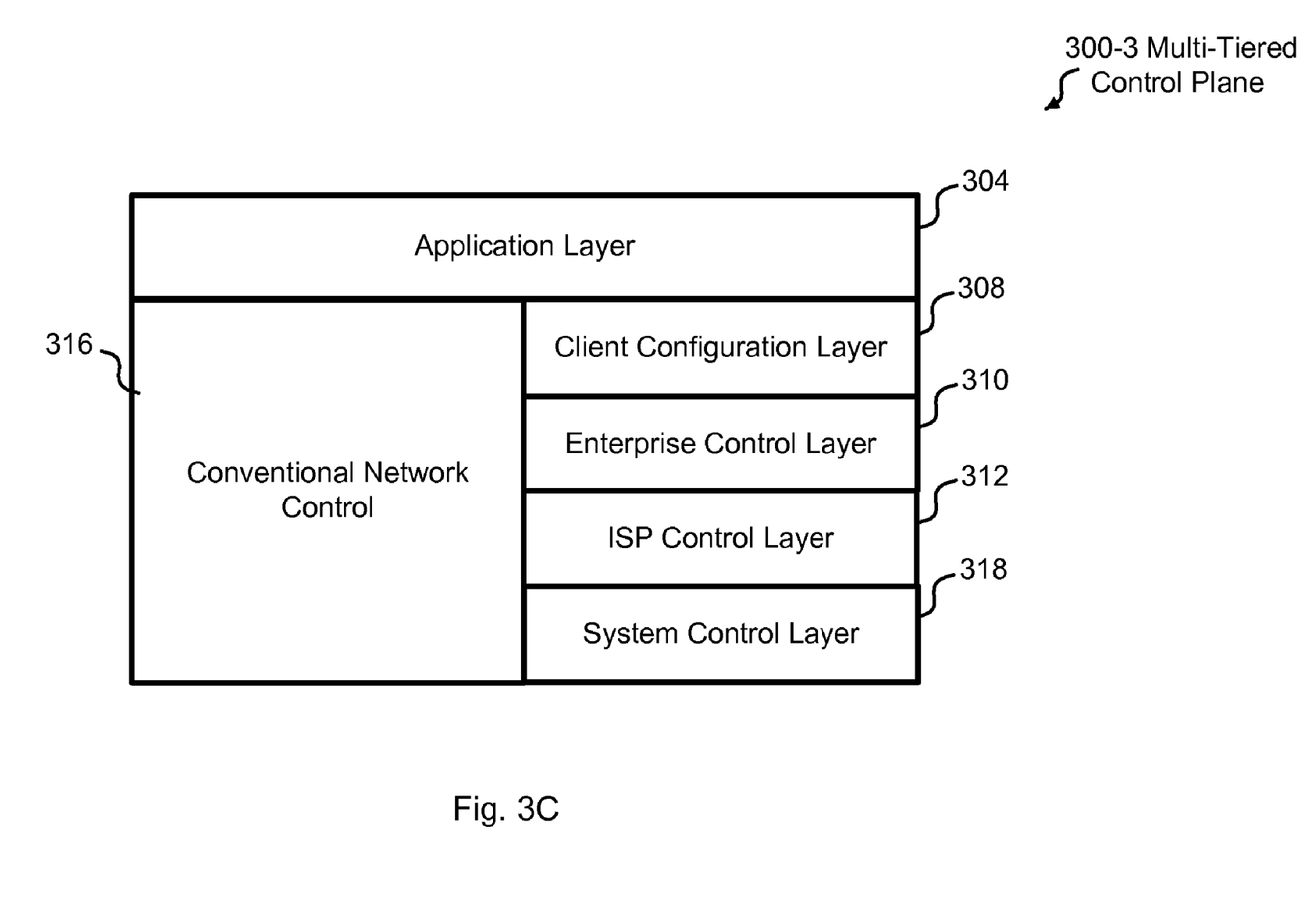

With reference to FIG. 3C, a diagram showing yet another embodiment of a multi-tiered control plane 300-3 is shown. In this embodiment, the applications 232 in the application layer 304 determines if origin download or user originated download is to be used for a particular content object download. For the control layers for user originated download, there is an enterprise control layer 310 that allows businesses to specify control settings.

In comparison to control layer settings, status information might change more frequently. For example, based on the control layer settings, a policy with in the client layer control plane at the client 228 may prohibit servicing end user originated download requests when a VoIP call is in progress. Such a policy would likely result in the status of the client 228 changing on a frequent basis. For example, whenever a VoIP call is begun, the control layer in the client 228 indicates to the global resource authority 104, the local resource authority 208, or both that the client 228 is currently unavailable to service end user originated downloads. The global resource authority 104 may send a corresponding notification to the dispatcher 108.

Likewise, the local resource authority 208 may send a corresponding notification to the service engine 212.

Status information may also be forwarded by the ISP 124. For example, if the ISP 124 is experiencing a period of high congestion, it may send an indication to the global resource authority 104 to prohibit its end users from servicing end user originated download requests.

Status information may also include information with respect to the location of the computing device 224. The location of a client 228 may change if the associated computing device 224 is moved geographically or if it is connected to the network via an altered path. In one embodiment, location information is periodically reported and/or in response to a change in location.

Figure 4:
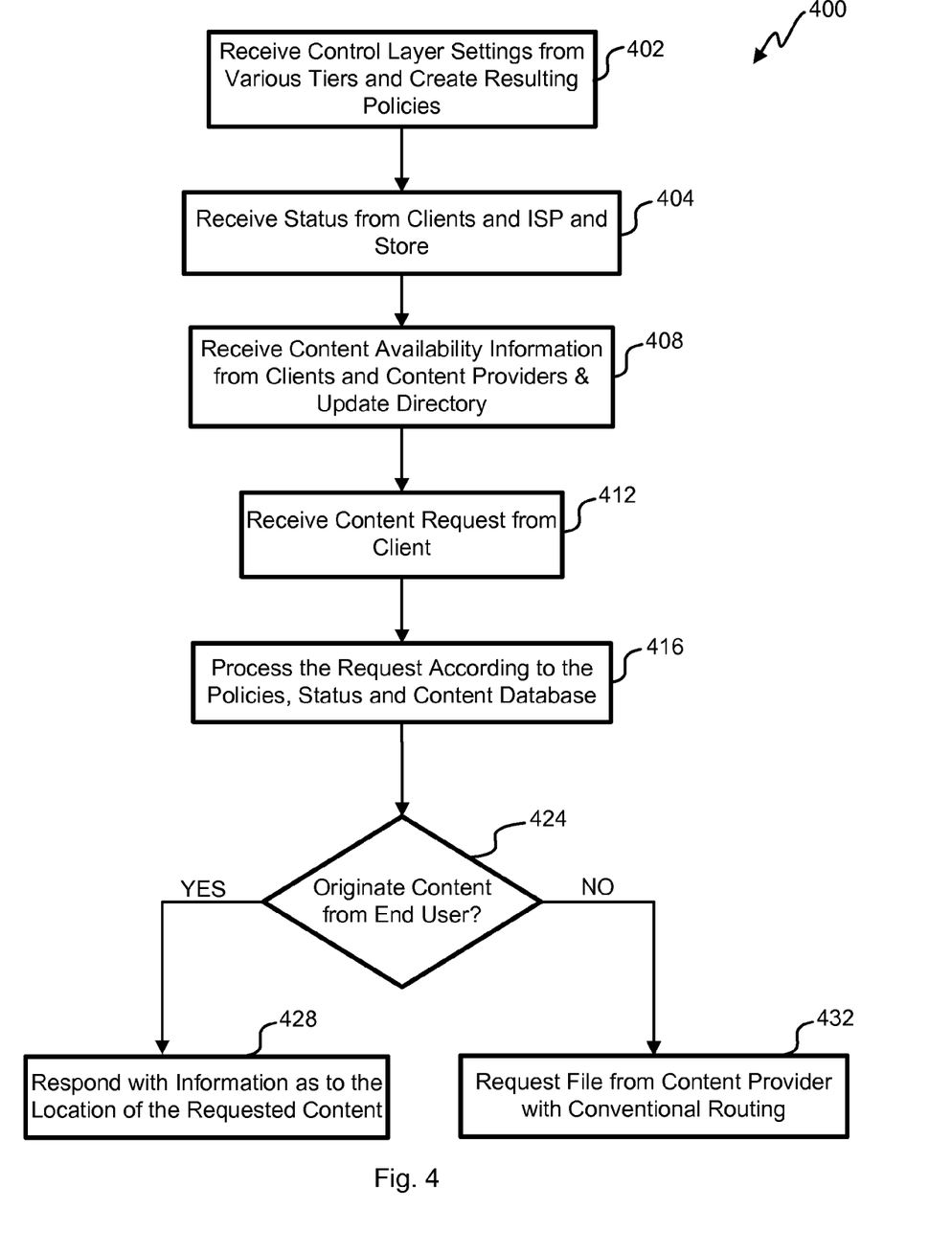
FIG. 4 illustrates a flowchart of an embodiment of a process for performing user originated download.

Referring next to FIG. 4, an embodiment of a process 400 for performing user originated download is shown from the perspective of a content delivery network operating the global resource authority 104, the control layer database 112, the dispatcher 108, the content database 116 as well as the client database 118. The depicted portion of the process begins in block 402 where control layer settings are received from various tiers that are defined for a particular client 228. In the embodiment shown in FIG. 1, the control layer database 112 holds the control settings and resulting policies for the clients 228. Status information for the clients is reported in block 404 and received, for example, by the client database 118. In block 408, the content objects available from the clients 228 are updated, typically in response to a polling inquiry or by periodic or sporadic reporting. In one embodiment, the content database 116 performs block 408. The original location of the content objects may also be stored such that the content provider can be queried for the content object if there is a problem getting the content object from another client.

Processing continues to block 412, where a request for content is received from a client 228. Alternatively, the requesting device could be on a computing device 224, a server engine 212 or other entity. The request is processed with reference to the policies of the requesting and sourcing entity, status and content database 118 in block 416. As such, the content objects available in response to the request are determined.

A determination is made in block 424 as to whether the content should be downloaded from another client or retrieved form the content provider 128. For some requests, the process may favor download from another client rather than going back to the content provider 128, even if the original request was made to a origin server. For example, user originated download may be favored when service from another end user would provide better network performance, QoS, efficiency or the like. The determination in block 424 could be variously made by the dispatcher 108, the client 228, super node or application 232 as well as other entities or combinations thereof. Where the content originates from another client, processing flows from block 424 to block 428 in which information is sent to the requesting end user regarding one or more end users which are capable of servicing the request. In one embodiment, the dispatcher 108 performs block 428. Where the content is to be sourced from an origin server, processing goes from block 424 to block 432 in which the content object is requested from the content provider using conventional origin download. In one embodiment, the dispatcher 108 performs blocks 416, 424, 428 and 432.

Thus, data transfer system 100 expressly shown in one instantiation in FIG. 1 is configured to allow content download between end user devices, such as, for example, computing devices 224. The data transfer system 100 has a first client associated with a first device capable of communication over the Internet and configured to provide a first setting from which a first set of potentially eligible sources can be determined, as described herein. According to one of many examples which could be developed, the first client 228-1 communicates with the Internet 120 using the ISP network 204, the router 236 and the LAN 220. One possible setting which the first client 228-1 may specify is that it accepts content only from sources having a data transfer rate of 300 kbps or higher. Such a setting may render some possible sources ineligible to provide content to the first client 228-1. In such a way, the first setting is one aspect that indicates a set of potentially eligible sources. Of course, the data transfer system 100 also includes many other client stations, such as the second client 228-2, which are capable of communication over the Internet.

As described above, the data transfer system 100 includes multiple entities which may provide settings. For example, a network entity, such as, for example, ISP 124-1, may be configured to provide a second setting from which a second set of potentially eligible sources can be determined. For example, the network entity may specify a setting which limits the maximum transfer rate for point-to-point data transfer to 50 kbps in order to better manage the burdens imposed on the system by point-to-point traffic. In one embodiment, the data transfer system 100 receives the first and second settings as well as a request for content from the first client. The data transfer system 100 determines a policy based on the first and second settings. The policy allows determination of a set of eligible source devices. In one embodiment, the data transfer system 100 honors the network entity setting over the client station setting and, thus, determines the set of eligible source devices to include only those capable of transferring data at 50 kbps or less. In another embodiment, the data transfer system 100 selects a policy which satisfied the most restrictive setting. Other more complex processes are also possible.

Based on the request, the data transfer system 100 determines a subset of the set of eligible sources that have the content. In systems capable of point-to-point data transfer, the subset often includes one more client stations, such as second client 228-2. The data transfer system 100 sends an indication of the second client as being an eligible source of the content to the first client 228-1.

Figure 5:
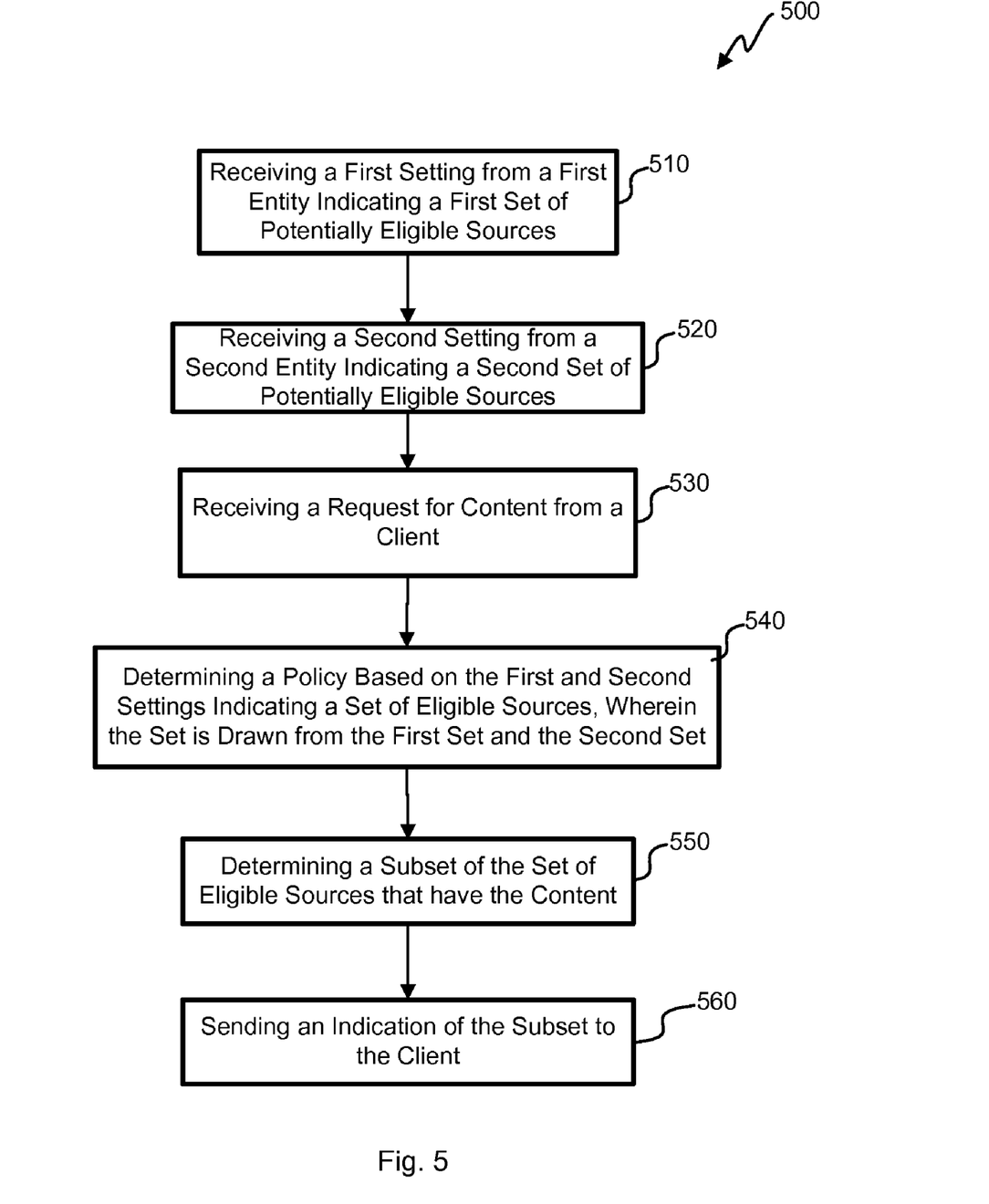
FIG. 5 illustrates a flowchart of an embodiment of a process for performing user originated download, generally from the perspective of the entities satisfying the request.

Referring to FIG. 5, a flowchart 500 of an exemplary embodiment is shown. In block 510, a first setting is received from a first entity indicating a first set of potentially eligible sources. In one example, the client 228 may specify that only sources with a delivery bandwidth of 1200 kbps are eligible sources for that particular client. In another example, the ISP 124 may characterize relationships between Internet components and specify the content sharing privileges associated with the various relationships. In block 520, a second group of one or more control layer settings is received from a second entity. For example, the content provider 128 may indicate that a request for designated streaming content may be satisfied by sourcing the streaming content between clients having a specified relationship.

In block 530, a request for content from a client is received. For example, in one embodiment, the dispatcher 108 receives a request from a first client that may have previously provided, or concurrently or subsequently provides, control layer settings. In another embodiment, another client or super node client may receive the request. Blocks 510, 520 and 530 can be executed in any order.

In block 540, one or more control layer policies are determined based on the control layer settings. Based upon the control layer policies, a set of one or more eligible sources is identified. For example, in one embodiment, the eligible sources may be a group of end users having the requested content and having a specified relationship to the requesting entity as well as the ability to deliver the content to the requesting entity at a minimum specified data rate. In another embodiment, one eligible source may be an origin server, such as any server cache etc. which is used to service a request for content in a conventional, non-point-to-point fashion and may be the content provider 128.

In block 550, a subset of the eligible sources that have the requested content are determined. For example, in one embodiment such a determination is made by the dispatcher 108 or a super node. In block 560, an indication of one or more entities having the requested content within the set of eligible resources is sent to the client.

Figure 6:
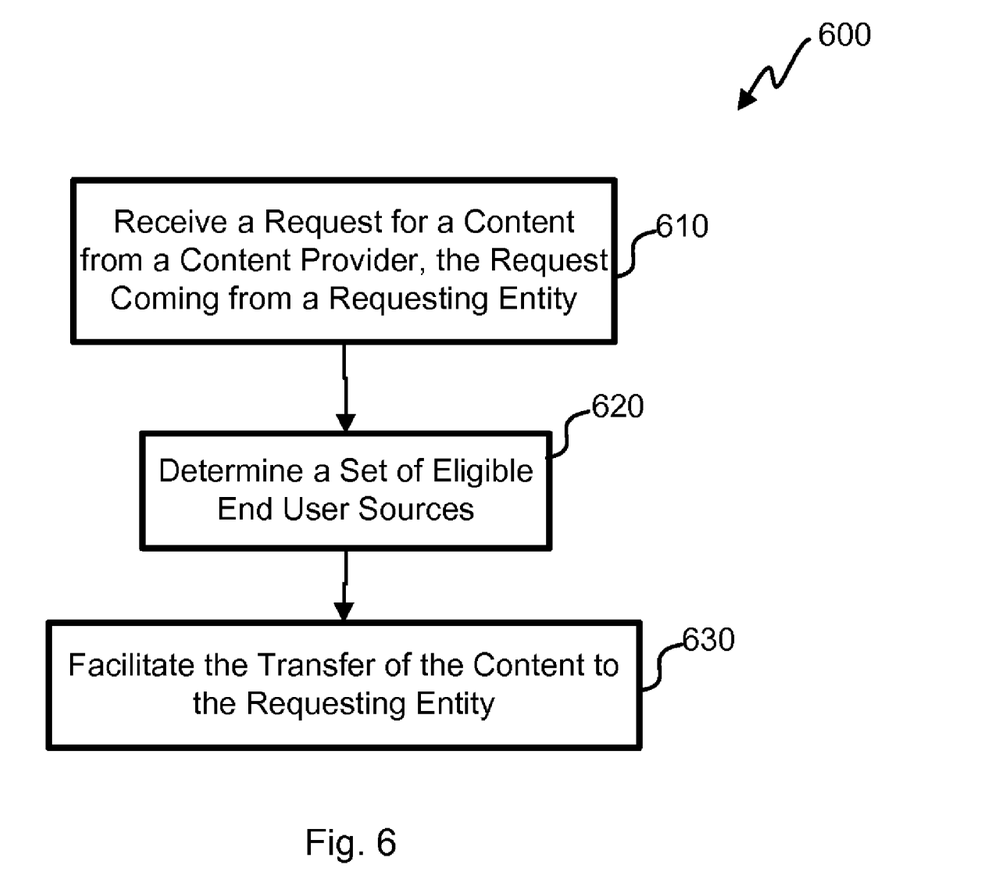
FIG. 6 illustrates a flowchart of an exemplary embodiment, generally illustrating the servicing of a request for origin server content by way of an end user download.

Referring to FIG. 6, a flowchart 600 of an exemplary embodiment is shown, generally illustrating servicing a request for origin server content by way of an end user. A requesting entity generates a request for content that originates from a content provider. In block 610, the request is received. For example, the application 232-2 requests a live sporting event streaming content. The client 228 parses the request according to its local policies. The client 228 sends the request to the dispatch 108. In block 620, a set of eligible end user sources that are eligible to source the content are determined. For example, in one embodiment, the dispatcher 108 receives one or more settings from the content provider 128 indicating that client stations within a business network can share content in a peer-to-peer fashion. Likewise, the dispatcher 108 may receive like settings from a content delivery entity specifying that particular content may be shared in a peer-to-peer fashion. In block 630, the transfer of content is facilitated. For example, the dispatcher 108 responds to the requesting entity specifying an end user from which to source the content. In this way, a request for content from a content provider is serviced in a peer-to-peer fashion. For example, if two end users within the business network 136 each make a request to the content provider 128 to watch the Olympics, rather than establish two parallel streams, the dispatcher 108 facilitates the transfer from a second entity in the business network according to settings received from the content provider 128 or the global resource authority 108.

Figure 7:
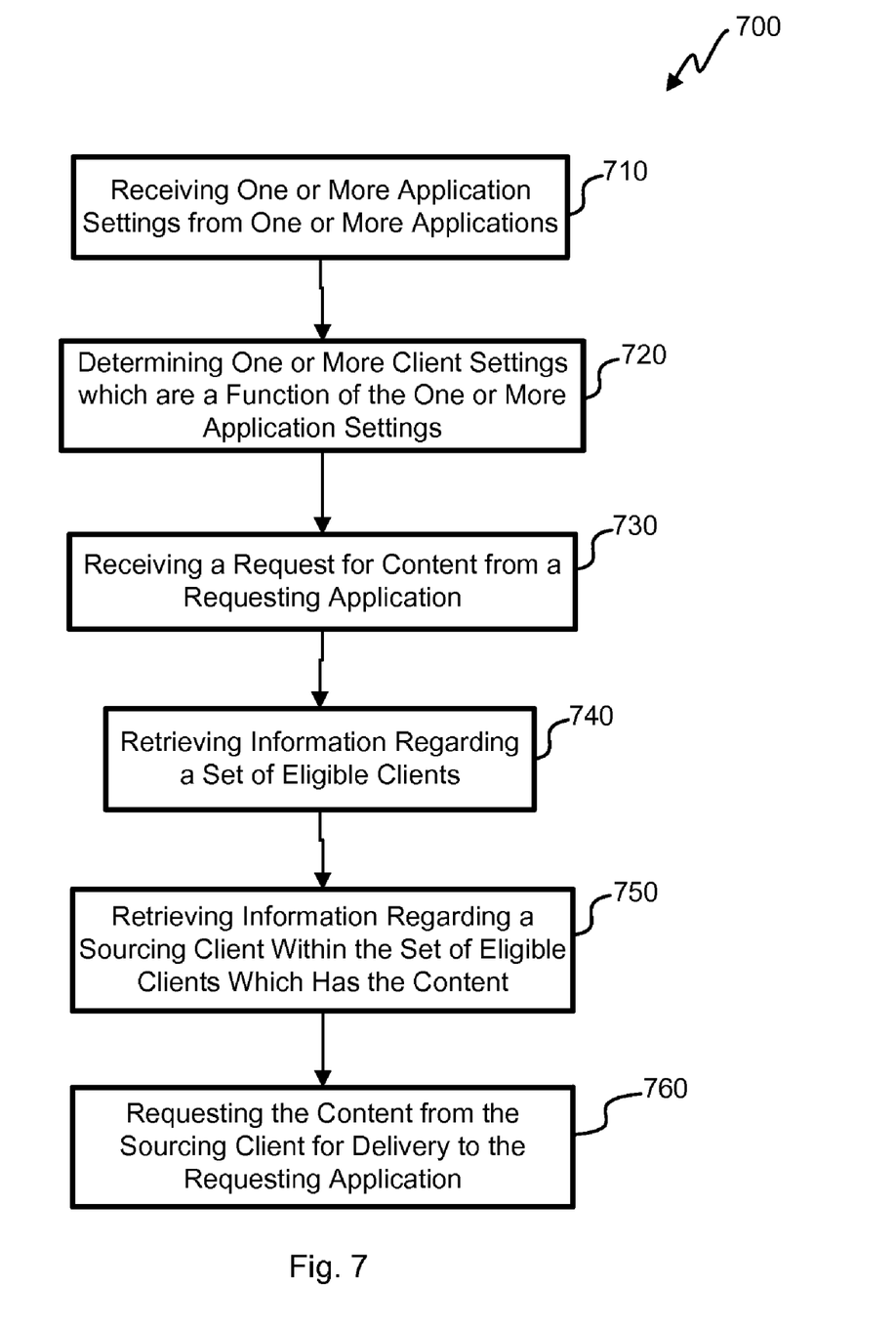
FIG. 7 illustrates a flow chart of an exemplary embodiment, including illustration of an aspect of the interaction between the application and client.

Referring to FIG. 7, a flowchart 700 of an exemplary embodiment is shown, including illustration of an aspect of the interaction between the application and client. In block 710, one or more application settings are received. Each setting indicates the characteristics of a first set of potentially eligible sources or requesters. For example the client 228 receives settings from one or more applications 232. A first application may limit the number of simultaneously outgoing end user downloads. Another application sets a minimum incoming data rate.

In block 720, one or more client settings are determined as a function of the one or more application settings. For example, the client 228 may merge the application settings with client layer settings associated with the client 228 to create the overall client settings. For example, the client 228 may determine internally created settings based upon control layer settings such as parental control settings. Typically, the client 228 honors the client layer settings over and above the application settings. As such, the client 228 may impose more restrictive settings, thereby potentially decreasing the number of potentially eligible sources. However, in some cases, the client 228 may expand the application settings, thereby potentially increasing the number of potentially eligible sources.

In block 730, a request for content is received by the client 228 from a application 232. For example, the requesting application 232 may make a request for an MP3 download. In block 740, information regarding a set of eligible clients is retrieved. For example, the set of eligible clients may be determined based on the one or more client settings and one or more network settings from an Internet component remote to the requesting client 228. The set of eligible clients matches or is a subset of the set of potentially eligible sources. The information regarding the set of eligible clients may be retrieved from the dispatcher 108, a super node, a module within the end user device etc.

In block 750, information regarding one or more specific sourcing clients from within this set of eligible clients is retrieved. The specific sourcing clients are capable of sourcing the requested content. In one embodiment, such information is retrieved from the dispatcher 108, a super node, a module within the end user device etc. In block 760, a request for the content is made. For example, the client 232 requests the content from one of the specific sourcing clients and passes the incoming data to the requesting application.

A number of variations and modifications of the disclosed embodiments can also be used. For example, some of the above embodiments discuss use of an end user computer to source a download. The system could be used to allow use and control of other resources on end user computers. For example, a user computer could be used for distributed computing at the control of the application, client, ISP, and/or system. Some embodiments could use the control plane to regulate machine virtualization of resources such as storage, bandwidth and processing power. For example, one end user could use another end user's hard drive to store their data.

While the principles of the disclosure have been described above in connection with specific apparatuses and methods, it is to be clearly understood that this description is made only by way of example and not as limitation on the scope of the disclosure.

What is claimed is:

1. A method for transferring content across a content delivery network (CDN), the method comprising:
   receiving, at a server in a content data network, a notification of a request for electronic content from a client;
   identifying a client associated with the request;
   identifying one or more global policies related to the request, each global policy of the one or more global policies defines a predetermined network group;
   determining whether the client is authorized to receive the content based at least partly on the identity of the client and the identified one or more global policies;
   identifying a source, among a plurality of sources, to provide the content to the client; and
   upon determining that the client is authorized to receive the content, initiating a transfer of the content from the source to the client.

2. The method for transferring content across the CDN of claim 1, wherein the source comprises another client.

3. The method for transferring content across the CDN of claim 1, wherein the source comprises a server in the CDN.

4. The method for transferring content across the CDN of claim 1, wherein the source comprises a server.

5. The method for transferring content across the CDN of claim 1, wherein the source comprises an origin server, the origin server having initially provided the content to the CDN.

6. The method for transferring content across the CDN of claim 1, wherein one or more of the global policies identifies circumstances clients are authorized to receive the content.

7. The method for transferring content across the CDN of claim 1, wherein one or more of the global policies includes a list of clients authorized to receive the content.

8. The method for transferring content across the CDN of claim 1, wherein the receiving the request for content comprises receiving the request for content from the client specifying content sourced from an origin server.

9. The method for transferring content across the CDN of claim 1, further comprising sending an indication of the identified source to the client.

10. The method for transferring content of claim 1, wherein the client is identified based on an identification sent by the client.

11. A data transfer system configured to allow transfer of content through a content delivery network (CDN) to a client device, the data transfer system comprising:
    a client associated with the client device capable of communication over the Internet:
    a global resource authority comprising a plurality of global policies indicating whether particular clients are authorized to access particular electronic contents, each global policy of the plurality of global policies defining a predetermined network group; and
    a dispatcher configured to, upon receiving a request for electronic content from the client:
      identify the client,
      identify one or more of the plurality of global policies applicable to the request,
      determine whether the client is authorized to receive the requested electronic content based on the one or more global policies, and
      upon determining that the client is authorized to receive the requested electronic content, allow the client to access the requested electronic content to the client.

12. The data transfer system configured to allow transfer of content through the content data network to a client device of claim 11, wherein the global resource authority is under control of an Internet service provider.

13. The data transfer system configured to allow transfer of content through the content data network to a client device of claim 11, wherein the global resource authority is under control of a content provider.

14. The data transfer system configured to allow transfer of content through the content data network to a client device of claim 11, wherein the global resource authority is under control of the CDN.

15. The data transfer system configured to allow transfer of content through the content data network to a client device of claim 11, wherein the one or more policies allow specific clients to globally access the content.

16. The data transfer system configured to allow transfer of content through the content data network to a client device of claim 11, wherein the one or more policies allow clients to access the content only under limited circumstances.

17. The data transfer system configured to allow transfer of content through the content data network to a client device of claim 11, wherein the dispatcher includes the policies from the global resource authority.

* * * * *